March 3, 1936.  H. D. NEWHART  2,032,377
VIBRATION DAMPENER
Filed March 6, 1933  2 Sheets-Sheet 1
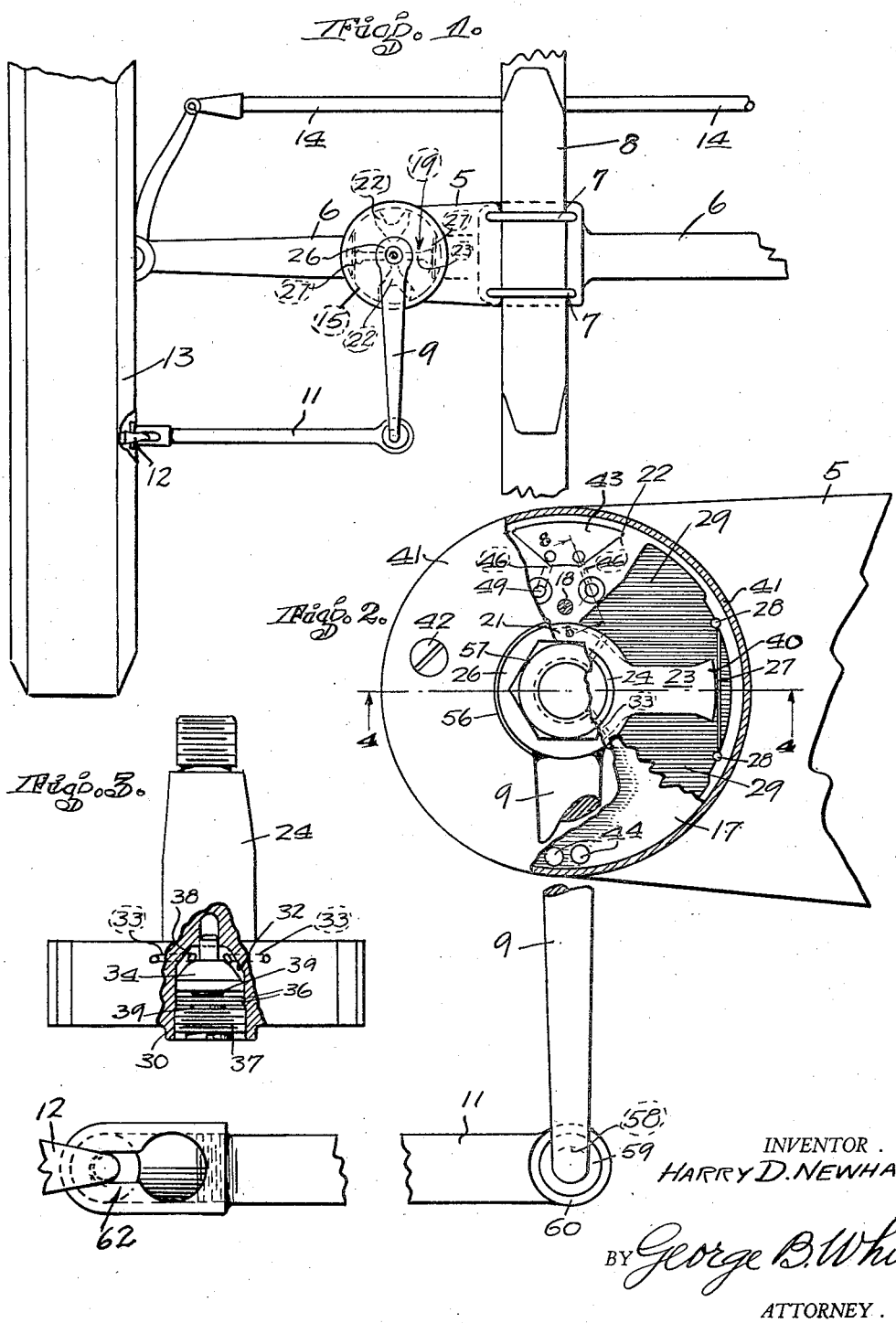
INVENTOR.
HARRY D. NEWHART
BY George B. White
ATTORNEY.

March 3, 1936. H. D. NEWHART 2,032,377
VIBRATION DAMPENER
Filed March 6, 1933 2 Sheets-Sheet 2
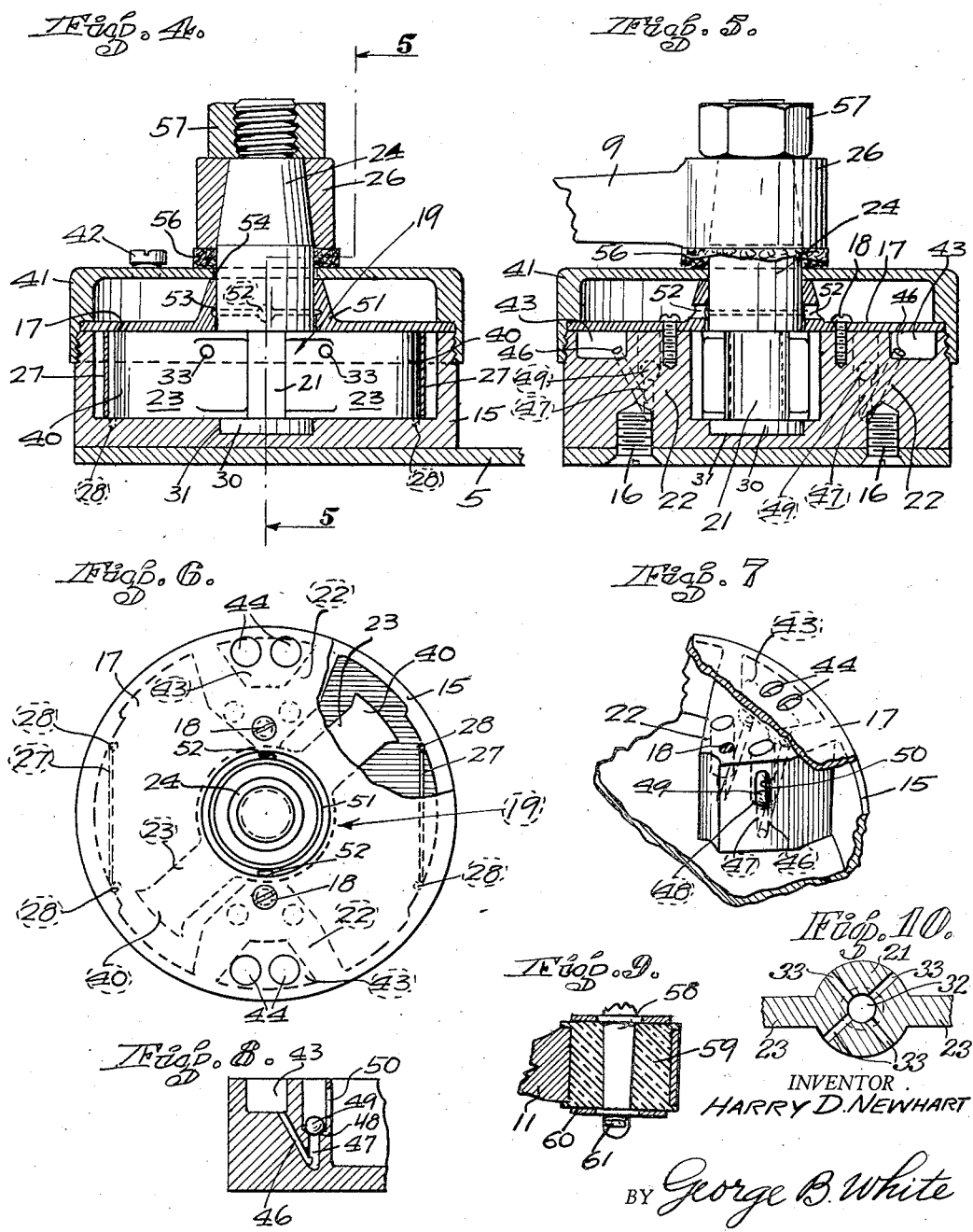
INVENTOR.
HARRY D. NEWHART
BY George B. White
ATTORNEY.

Patented Mar. 3, 1936

2,032,377

UNITED STATES PATENT OFFICE 2,032,377

VIBRATION DAMPENER

Harry D. Newhart, San Anselmo, Calif., assignor of one-half to Robert N. Carson, Jr.

Application March 6, 1933, Serial No. 659,766

23 Claims. (Cl. 188—89)

This invention relates to vibration dampeners.

There were some attempts made in the past to provide motion-checking devices for holding the wheels of automobiles or other devices in their true path so as to prevent the transmission of wheel or other strains to the operating or steering mechanisms, but experiments show that the checking of motion in any manner heretofore known impedes the steering or hinders the movement of moving parts. Consequently, in attempts of this kind heretofore made ease of steering had to be sacrificed to remedy to a certain degree the vibration and shimmying.

The wheel shimmying in the steering gear of automobiles, for instance, is a periodical lateral wobbling or shaking of the wheels due to some force that starts them to vibrate and further periodical impulses which tend to amplify these vibrations resulting in a very pronounced shaking of the wheels which makes steering difficult. The danger of such vibration of wheels, especially at high speeds is well known. The hydraulic dash-pot type dampeners, used in some attempts heretofore made to reduce shimmying, introduces a direct resistance to the steering action, which is very troublesome and renders the quick maneuvering of the steering mechanism very difficult. Other attempts for shimmying dampening relied upon the inertia of a mass to counter balance the tendency of vibration. In these inertia devices if the mass or weight is too small, then a quick vibration will start to swing it and in effect it will ultimately aggravate the vibration, and if the mass or weight is larger, then it produces a very material drag on the steering mechanism.

The primary object of the herein invention is to provide a vibration dampener which offers definite resistance to quick movement at a neutral or straight position, and only to an extent required by the expected wheel shimmy, but which leaves the steering mechanism completely free to move.

Another object of the invention is to provide a device for checking quick, jerky motion, in which a moving member and a stationary member are locked together in one position, said position corresponding to the true path of movement of the vehicle or machine on which the device is used, means being provided to allow comparatively slow movement of the moving member out of its locked position, yet positively prevent any movement at a rate above a predetermined speed of motion, the device being also adapted to leave the moving member entirely free and unobstructed as soon as it is moved out of said initial position; the device relies in its operation on an arrangement of pressure chambers and bypass between the chambers; heat responsive means being provided to maintain a constant bypass irrespective of temperature changes; and means being also provided to prevent the forming of foam bubble, or air pockets in said chambers by keeping the same filled at all times.

Other objects and advantages are to provide a shimmy dampener that will be superior in point of simplicity, inexpensiveness of construction, positiveness of operation, and in facility and convenience in use and in general efficiency.

While the invention is illustrated in this specification and the annexed drawings, primarily in the form considered the best for a steering gear of automobiles, it will be obvious that it has a much wider application, as it can be used on the controls of an airplane, steering gear of a boat or torpedo, and almost anywhere where any control or steering mechanism may be subjected to undesirable vibrations, therefore, it is to be understood that the invention is not limited to the form herein shown, because it may be embodied in other forms; and it is also to be understood that in and by the claims following the description, it is desired to cover the invention in whatsoever form it may be embodied.

The invention is clearly illustrated in the accompanying drawings, wherein

Fig. 1 is a fragmental plan view of the front portion of the running gear, showing the dampening device applied.

Fig. 2 is a plane view of dampening device part of the cover, and upper elements being broken away exposing to view a portion of the interior of the device.

Fig. 3 is a detail view of the piston of the device, part of the hub being broken away to show the heat responsive bypass control.

Fig. 4 is a sectional view of the device, the section being taken substantially on the line 4—4 of Figure 2, the piston of device being shown in elevation.

Fig. 5 is a cross sectional view of the device, the section being taken on the line 5—5 of Figure 4, the lower part of the piston being shown in elevation.

Fig. 6 is a top plan view of the device, moved out of its initial or neutral position, the device being shown without the reservoir, part of the cover plate being broken away.

Fig. 7 is a fragmental, perspective view of the casing, showing the journal block therein.

Fig. 8 is a fragmental, sectional view of the casing, the section being taken on the line 8—8 of Figure 2.

Fig. 9 is a sectional view of the end of the lever arm connection to the link bar of the device.

Figure 10 is a fragmental, sectional, plane view of the piston in my device, the section being taken through the intercommunicating passages in the piston hub.

In its general organization my motion-checking device, when used as a shimmy dampener is mounted on a base plate 5, which latter in turn is secured over a front axle 6 in any suitable manner, such as by the U bolts 7 of the leaf spring 8. A lever arm 9 of the device is connected by a connecting link 11 to a suitable lug 12 on the non-rotating backing plate of the vehicle front wheel 13. Instead of the connection of the lever arm 11 to the front wheel 13, the same may be connected to the usual tie rod 14 of the steering gear of the automobile.

Before the wheel 13 can move out of its straight position, which is its normal true path, it has to move the lever arm 9, and the motion of the latter by the wheel 13 is not resisted by my dampening device, unless the tendency of motion is quicker, than steering speed, in which latter case the arm 9 resists the force practically as if it were locked in its initial position.

The dampener itself includes a casing 15 secured on the base plate 5 by screws 16, shown in Figure 5. The casing 15 is cylindrical and is open at its top. A cover plate 17 covers the top of the casing 15 and is held in place by screws 18. In the casing 15 is a piston 19, the hub 21 of which is journaled between diametrically opposite journal blocks 22 formed in the casing 15. The bearing thus formed is located centrally in the casing 15 and allows the piston 19 to oscillate around its axis. Diametrically opposite wings or arms 23 extend from the piston hub 21 toward the periphery of the casing 15. It is to be noted that the arms 23 are shorter than the radius of the inner periphery of the casing 15 to allow the ends of the arms 23 to move freely in the casing 15 without any obstruction. The height of the piston hub 21 and the arms 23 fits snugly between the bottom of the casing 15 and the lower face of the cover plate 17 so that any fluid in the casing 15 can flow only around the outer ends of said arms 23.

The casing 15 is filled with a suitable fluid such as oil. As the piston 19 is oscillated the arms 23 move freely in the oil, and the oil can flow around the outer ends of the arms 23, hence there is no resistance whatever to the oscillating movement of the piston 19.

A shaft 24 extends from the hub 21 of the piston 19 and the hub 26 of the lever arm 9 is fixed to the shaft 24, so that any turning movement of the lever arm 9 tends to rotate and oscillate the piston 19. In order to prevent the oscillation of the piston 19 out of its initial position, shown in Figure 2 opposite, flexible diaphragms 27 are secured in the casing 15, opposite the respective ends of the arms 23 when the latter are in the said initial or neutral position. Each diaphragm 27 consists of a spring leaf of the same height as that of the arms 23 so that no oil can pass over the top or below the diaphragms 27. The diaphragms 27 are held in place by pins 28, one at each end of each diaphragm 27. Each diaphragm is in a position to form a chord of the inner periphery of the casing 15 midway between the positions of the journal blocks 22.

The diaphragms 27 are tangential to the outer ends of the piston arms 23, and in the initial or neutral position of the piston 19 the outer ends of the arms 23 are in contact with the respective diaphragms, thereby normally preventing the passage of oil from one side of the arms 23 to the other. Thus the casing 15 is divided, by the journal blocks 22 and by the arms 23 and diaphragms 27, into four chambers 29, one on each side of each arm 23. In the absence of any escape for the oil from the chambers 29 the piston 19 would be substantially fixed and locked in its neutral, initial position, as against normal expected vibration caused by shimmying and the like. In case of a severe action applying suddenly more force than the usual vibration, such as the force of shoving off from a curve the diaphragms 27 are then bent outwardly by the excessive pressure, allowing escapement of oil from one side of the arm 23 to the other side similarly to a safety valve. The diaphragms having workable clearances will allow oil in the rear thereof to escape out to the low pressure sides of the arms 23.

In order to provide limited escapement of the oil from chamber to chamber at all times a by-pass is provided in the piston hub 21. The bottom of the piston hub 21 has a cylindrical extension 30 thereon which fits into a corresponding cavity 31 thereby to provide additional bearing. The extension 30 and the piston hub 21 are hollow. The inner end of the hollow portion of the hub 21 is formed into a conical valve seat 32, as shown in Figure 3. Passages 33 extend from the outside of the hub 21 to said valve seat 32. There is a passage 33 leading from each side of each arm 23 to the valve seat 32, which establish intercommunication between the chambers 29 through the hollow portion of the piston hub 21. A valve 34 is slidably disposed in the hollow portion of the piston hub 21. The valve 34 fits over the valve seat 32, and rests upon metal discs 36, which latter in turn rest upon the inner end of a plug 37. The outer end of the hollow portion of the hub 21 is internally threaded to hold the externally threaded plug 37 in place. The plug 37 and the discs 36 are so arranged that the valve 34 normally drops below the orifices 38 of the passages 33 and leaves the same entirely unobstructed.

The discs 36 are made of such material as to be sensitive to heat, and expand and contract readily. For instance, each disc 36 is made of two layers welded together at the edge, the layers having definite coefficients of expansion, such as one layer of invar steel and another layer of brass. The bending or bulging caused by the unequal expansion of the layers in each disc moves the valve 34 upwardly. Both on the bottom of the valve 34 and on the top or inner end of the plug 37 is a cylindrical boss 39 of smaller diameter than that of the plug, against which the discs 36 bear. The discs 36 are of substantially the same diameter as that of the hollow of the hub 21. In this manner a heat responsive bypass regulation is provided, which is necessary to compensate for changes in the fluidity of the oil due to temperature changes.

When the temperature of oil increases it is more viscous or fluid and flows faster through the passage 33. But the heat also causes the discs 36 to expand and bend slightly thereby moving the valve 34 toward its valve seat 32 partially covering the orifices 38 of the passages 33. Thus the flow through the passages 33 is restricted in accordance with the rise in temperature. On the other hand cooling of the oil will cause it to flow slower, and the dropping of the temperature will also cause the contraction of the discs 36, hence the valve 34 will be allowed to drop away from its valve seat 32 and uncover the orifices 38, in accordance with the lowering of oil temperature.

The above described heat responsive bypass regulation maintains a constant limit of oil escapement from chamber to chamber. The sizes of the passages 33 are such that oil can not escape through them fast enough to take care of quick, jerky movements of the piston 19, such as the movement caused by shimmying; yet the escapement is sufficiently fast to allow the speed of piston oscillation caused by steering. Consequently the piston 19 is practically locked in its neutral or initial position against quick vibrations and shimmying movements, but does not offer any resistance to steering. This is especially true, because as soon as the steering movement moves the ends of the piston arms 23 out of contact with the diaphragms 27, the division into chambers 29 ceases and the oil can freely move around the arms 23.

In order to facilitate the movement of the ends of the piston arms 23 into and out of contact with the diaphragms 27, and to prevent excessive friction therebetween, the ends of the piston arms 23, are formed into flared heads 40, with arcuate contact surfaces concentric with the inner periphery of the casing 15. In effect, this results in practically a one line contact between each arm head 40 and its diaphragm 27 at the tangent line. Certain wheels have a tendency to shimmy not only at straightaway position but also at a slight turn, in order to resist such vibration throughout the entire arc of possible shimmying, the heads 40 of the arms 23 are flared as heretofore stated. In view of the fact that the arc of such possible shimmying is different on various wheels and tires the flare is formed of a width suitable to said possible arc of action.

While the aforedescribed bypass passages 33 prevent foaming, and bubbles to a certain degree, it is also advisable to provide means for keeping the casing 15 filled at all times, and to compensate for expansion and contraction of oil, and also to obviate the entrance of air and the forming of pockets in the body of oil in the casing 15. It is to be noted that the body of oil in the casing 15 is quiescent, and to prevent its motion the casing 15 should be kept filled. For this purpose I provide a reservoir cover 41 above the cover plate 17. The reservoir cover 41 is an inverted cup internally threaded at its open bottom for engagement with the externally threaded end of the casing 15. In the closed top of the reservoir cover 41 is an opening covered by a plug 42, through which opening the entire dampener can be filled with oil.

In the top of each journal block 22 is formed a cavity 43. The cover plate 17 covers these cavities 43. Apertures 44 through the cover plate 17 provide openings for the oil to flow from the reservoir cover 41 into the cavities 43. From the bottom of the cavities 43 extend passages 46, as clearly shown in Figure 8. There are two such passages 46 leading from each cavity 43, downwardly, one toward each side of the journal block 22. At the lower end of each passage 46 is a pocket 47. The upper end of each pocket 47 is above the outlet end of the passage 46, and terminates in a valve seat 48, on which latter is positioned a check valve 49. While in the present instance the check valve 49 constitutes a ball valve seated by its own gravity, spring pressed or other type check valves could be also used. Above the check valve 49 and in the side of the journal block 22 is an outlet 50 opening into a chamber 29. When there is no oil in the casing 15, or the pressure is reduced in the chambers 29 then the pressure of the oil from the reservoir cover 41 lifts the check valve 49 off its seat 48, and oil flows into the chambers 29. Other times the pressure in the chambers 29 keeps the ball valve 49 on its seat. In this manner the chambers 29 are automatically refilled, and the forming of air pockets or bubbles is positively obviated.

The cover plate 17 has a central sleeve 51 upwardly extended therefrom into the reservoir cover 41 and around the shaft 24. There are holes 52 on this sleeve 51, and the inner diameter of the sleeve 51 between the holes 52 and the casing 15 is slightly increased to facilitate seepage of oil to the holes 52. There is also a groove 53 on the inner periphery of the sleeve 51 and at the holes 52. If expansion of oil or other causes of increased pressure in the chambers 29 necessitate expulsion of oil from said chambers 29, then the oil is forced into the comparatively small clearance between the top of the hub 21 and the cover plate 17 and then out through the holes 52 into the reservoir cover 41. After the oil contracts, or the cause of excessive pressure is eliminated the chambers 29 are refilled through the cavities 43, passages 46, pockets 47, and outlets 50 as heretofore described.

The shaft 24 extends through a hole 54 to the outside of the reservoir cover 41. An absorbent, protective washer 56, of fibrous material is placed around the shaft 24 and over the hole 54, to allow air into the reservoir cover 41, but prevent seepage of oil to the outside. The hub 26 of the lever arm 9 is disposed on this washer 56 and is held in place by a nut 57 which latter is on the threaded outer end of the shaft 24.

The joint, whereby the outer, bent end 58 of the arm 9 is connected to the link 11 consists of an apertured rubber pad or socket 59 on the end of the link 11. A cotter pin 61, or the like, prevents the disengagement of the end 58 of the lever arm 9 from disc 60. When due to misalignment or for other reasons a twisting force is applied to the lever arm 9 then the pad 59 is compressed by the bent end 58 of said lever arm 9 without allowing any looseness or play otherwise.

The connection 62 shown at the other end of the link 11 may be also a rubber socket, or it may be a ball and socket joint as shown.

In operation the piston 19 is practically fixed and locked in its initial or neutral position, as against quick jerks, vibration or shimmy, because the oil cannot flow fast enough from chamber 29 to chamber 29 to allow any such quick movement. When turned at steering speed the arms 23 of the piston 19 force the oil to flow through the bypass passages 33 at sufficient rate of flow to allow unresisted turning of the piston 19 from its neutral or initial position, and thereafter the arms 23 move entirely free in the body of oil in the casing 15 without even any further bypass. On account of the flared heads 40 of the arms 23 shimmying is resisted during the beginning of the turn of the wheel until the wheel is turned to an angle at which shimmying is improbable. On the other hand in case of excessively sudden shocking force such as the wheel hitting against a curb and the like, the flexible diaphragms 27 are bent by the sudden force allowing escape of oil from the sides of arms 23 under pressure to the other sides of the arms 23. But the diaphragms 27 are not flexible enough to bend under normal vibration such as wheel shimmying.

Having thus described this invention, what I claim and desire to secure by Letters Patent is:

1. In a motion checking device, a stationary element, a moving element, a body of normally quiescent fluid, yieldable means coacting with said moving element to resist movement of the fluid only when the moving element is in an initial position relatively to the stationary element and to allow free movement of the fluid relatively to the moving element in other positions, thereby to cause said body of fluid to resist sudden movement of the moving element from said initial position, means to allow movement of said moving element from said initial position at a predetermined rate of motion, and heat responsive control means for said escapement means to regulate escapement according to the temperature of the fluid.

2. In a motion-checking device, the combination of elements movable with respect to each other, a body of normally quiescent fluid, yieldable means on one element and being engaged by the other element to cause said fluid to act as a resistance between the elements in only one, initial position of said elements, and means to bypass a limited amount of said fluid to allow the relative movement of said elements from said initial position at a limited rate of speed.

3. In a motion-checking device, the combination of elements movable with respect to each other, a body of normally quiescent fluid, yieldable means to cause said fluid to act as a resistance between the elements in only one, initial position of said elements, means to bypass a limited amount of said fluid to allow the relative movement of said elements from said initial position at a limited rate of speed, and heat responsive control means for said escapement means to regulate escapement according to the temperature of the fluid.

4. In a motion-checking device the combination of a casing, a piston movable within the casing, a body of normally quiescent fluid located in chambers on each side of the piston, and resiliently yieldable means engaged by the end of the piston to prevent the passage of the fluid from one side of the piston to the other in one position of the piston but allowing free flow of fluid around the piston in other positions.

5. In a motion-checking device the combination of a casing, a piston movable within the casing, a body of normally quiescent fluid located in chambers on each side of the piston, resiliently yieldable means to prevent the passage of the fluid from one side of the piston to the other in only one position of the piston but allowing free flow of fluid around the piston in other positions, and means to allow a limited escapement of the fluid from one side to the other side of the piston at all times to allow the initial movement of the piston out of said position at a limited rate of speed.

6. In a motion-checking device the combination of a casing, a piston movable within the casing, a body of normally quiescent fluid located in chambers on each side of the piston, resiliently yieldable means to prevent the passage of the fluid from one side of the piston to the other in only one position of the piston but allowing free flow of fluid around the piston in other positions, a bypass to intercommunicate the chambers on the opposite sides of the piston, and heat controlled means to automatically regulate said bypass.

7. In a device of the character described, a casing, a body of fluid in the casing, a piston movable in the casing, an arm formed on the piston, the free end of the arm being spaced from the wall of the casing to allow unobstructed movement of the piston in said body of fluid and a flexible diaphragm in the casing to be engaged by the free end of the piston arm in a certain position of the piston so as to prevent flow of fluid from one side of the arm to the other in said position thereby causing said fluid to resist piston movement out of said position.

8. In a device of the character described, a casing, a body of fluid in the casing, a piston movable in the casing, an arm formed on the piston, the free end of the arm being spaced from the wall of the casing to allow unobstructed movement of the piston in said body of fluid; a flexible diaphragm in the casing to be engaged by the free end of the piston arm in a certain position of the piston so as to prevent flow of fluid from one side of the arm to the other in said position thereby causing said fluid to resist piston movement out of said position, and means to bypass a limited flow of fluid from one side of the piston to the other to bypass the fluid from the path of the piston when the piston is moved off said diaphragm with a limited speed of movement.

9. In a device of the character described, a casing, a body of fluid in the casing, a piston movable in the casing, an arm formed on the piston, the free end of the arm being spaced from the wall of the casing to allow unobstructed movement of the piston in said body of fluid; a flexible diaphragm in the casing to be engaged by the free end of the piston arm in a certain position of the piston so as to prevent flow of fluid from one side of the arm to the other in said position thereby causing said fluid to resist piston movement out of said position, and means to bypass a limited flow or fluid from one side of the piston to the other to bypass the fluid from the path of the piston when the piston is moved off said diaphragm with a limited speed of movement, and heat responsive means to automatically regulate said bypass.

10. In a device of the character described, a casing, a body of fluid in the casing, a piston movable in the casing, an arm formed on the piston, the free end of the arm being spaced from the wall of the casing to allow unobstructed movement of the piston in said body of fluid; a flexible diaphragm in the casing to be engaged by the free end of the piston arm in a certain position of the piston so as to prevent flow of fluid from one side of the arm to the other in said position thereby causing said fluid to resist piston movement out of said position, and means to bypass a limited flow or fluid from one side of the piston to the other to bypass the fluid from the path of the piston when the piston is moved off said diaphragm with a limited speed of movement, and a reservoir to hold a reserve body of fluid, means of connection between the casing and said reservoir to allow limited seepage under pressure from the former to the latter, and means to communicate the reservoir with the casing on the respective sides of the piston arm to refill the space thereat when pressure in said casing is reduced below a predetermined limit.

11. In a device of the character described, a casing, a body of fluid in the casing, a piston movable in the casing, an arm formed on the piston, the free end of the arm being spaced from the wall of the casing to allow unobstructed movement of the piston in said body of fluid; a flexible diaphragm in the casing to be engaged by the free end of the piston arm in a certain position of the piston so as to prevent flow of fluid from one side of the arm to the other in said position thereby causing said fluid to resist piston movement out of said position, and means to bypass a limited flow of fluid from one side of the piston to the other to bypass the fluid from the path of the piston when the piston is moved off said diaphragm with a limited speed of movement, and heat responsive means to automatically maintain a constant rate of bypass under various temperature conditions.

12. In a motion-checking device, a casing, a normally quiescent body of fluid in a compression space in the casing, an oscillating piston in the casing being spaced from the inner periphery of the casing for unobstructed movement in said space, yieldable means coacting with the free end of the piston to separate the compression space into separate chambers in one predetermined position of the piston so that the fluid in said separated chambers resists movement of the piston from said predetermined position, and means to bypass a limited amount of fluid from chamber to chamber from the path of the piston movement when the piston is moved at a limited rate of motion.

13. In a motion-checking device a stationary casing, a piston oscillatable in the casing, a plurality of wings on the piston, a body of fluid in the casing, the free ends of the wings of the piston being spaced from the inner periphery of the casing, diaphragms in the casing engageable by the free end of the respective wings in a one position only of the piston to divide the casing into a plurality of separate chambers, and means to establish a limited communication between the chambers for a predetermined escape of fluid from chamber to chamber as the piston is oscillated at a certain speed of motion.

14. In a motion checking device of the character described, the combination of a casing, a body of fluid in the casing, a piston oscillatable in the casing, the free end of the piston being spaced from the wall of the casing to allow unobstructed movement of the piston in said body of fluid, an abutment in the casing to be engaged by the free end of the piston in a certain position so as to prevent flow of fluid from one side of the piston to the other around said free end in said position thereby to resist piston movement out of said position, the end of said piston adjacent said abutment being arcuate, and said abutment being tangential to the arc of said piston end.

15. In a motion checking device of the character described, the combination of a casing, a body of fluid in the casing, a piston oscillatable in the casing, the free end of the piston being spaced from the wall of the casing to allow unobstructed movement of the piston in said body of fluid, an abutment in the casing to be engaged by the free end of the piston in a certain position so as to prevent flow of fluid from one side of the piston to the other around said free end in said position thereby to resist piston movement out of said position, the end of said piston adjacent said abutment being arcuate, and said abutment being flexible and tangential to the arc of said piston end.

16. In a motion checking device of the character described, the combination of a casing, a body of fluid in the casing, a piston oscillatable in the casing, the free end of the piston being spaced from the wall of the casing to allow unobstructed movement of the piston in said body of fluid, an abutment in the casing to be engaged by the free end of the piston in a certain position so as to prevent flow of fluid from one side of the piston to the other around said free end in said position thereby to resist piston movement out of said position, the end of said piston adjacent said abutment being arcuate, said abutment being flexible and tangential to the arc of said piston end, and being arranged to form an auxiliary fluid chamber behind said abutment.

17. In a motion checking device of the character described, the combination with a casing having a body of fluid therein, an element journalled in the casing to be oscillatable therein, substantially diametrically opposite wings extended from said element, the free ends of said wings being spaced from the inner periphery of the casing to move freely in said fluid, and substantially diametrically opposite abutments in the casing to be engaged by the ends of the respective wings in a certain position of said member to resist relative fluid and wing movements in said position.

18. In a motion checking device of the character described, the combination with a casing having a body of fluid therein, an element journalled in the casing to be oscillatable therein, substantially diametrically opposite wings extended from said element, the free ends of said wings being spaced from the inner periphery of the casing to more freely in said fluid, substantially diametrically opposite abutments in the casing to be engaged by the ends of the respective wings in a certain position of said member to resist relative fluid and wing movements in said position, and separating elements in the casing positioned substantially at right angles to the position of said abutments to separate from each other the chambers within which the opposed wings move.

19. In a motion checking device of the character described, the combination with a casing having a body of fluid therein, an element journalled in the casing to be oscillatable therein, substantially diametrically opposite wings extended from said element, the free ends of said wings being spaced from the inner periphery of the casing to move freely in said fluid, substantially diametrically opposite abutments in the casing to be engaged by the ends of the respective wings in a certain position of said member to resist relative fluid and wing movements in said position, separating elements in the casing positioned substantially at right angles to the position of said abutments to separate from each other the chambers within which the opposed wings move, and means to establish a limited communication between the chambers.

20. In a motion checking device of the character described, the combination with a casing having a body of fluid therein, an element journalled in the casing to be oscillatable therein, substantially diametrically opposite wings extended from said element, the free ends of said wings being spaced from the inner periphery of the casing to move freely in said fluid, substantially diametrically opposite abutments in the casing to be engaged by the ends of the respective wings in a certain position of said member to resist relative fluid and wing movements in said position, separating elements in the casing positioned substantially at right angles to the position of said abutments to separate from each other the chambers within which the opposed wings move, means to establish a limited communication between the chambers, and temperature controlled means to automatically adjust said communication in accordance with the temperature of said fluid.

21. In a motion checking device a stationary casing containing a body of fluid, a plurality of pistons freely movable together in said body of fluid, means for transmitting force to said pistons to oscillate the pistons simultaneously, spaced elements on said casing so arranged that the elements are contiguous with the respective pistons in only one initial position of the respective pistons and being adapted to prevent movement of fluid from one side of the respective pistons to the other in said initial position, and partitions in said casing disposed between said initial positions of the pistons so as to separate the casing into as many chambers as the numbers of pistons working in the casing, a reservoir to hold a reserve body of fluid, and means in said partitions to establish controlled one way communication from the reservoir to each of said chambers on either side of each partition.

22. In a motion checking device a stationary casing containing a body of fluid, a plurality of pistons freely movable together in said body of fluid, means for transmitting force to said pistons to oscillate the pistons simultaneously, spaced elements on said casing so arranged that the elements are contiguous with the respective pistons in only one initial position of the respective pistons and being adapted to prevent movement of fluid from one side of the respective pistons to the other in said initial position, and partitions in said casing disposed between said initial positions of the pistons so as to separate the casing into as many chambers as the numbers of pistons working in the casing, said elements being positioned substantially intermediately between the respective adjacent partitions, a reservoir to hold a reserve body of fluid, and means in said partitions to establish controlled one way communication from the reservoir to each of said chambers on either side of each partition.

23. In a motion checking device a stationary casing containing a body of fluid, a piston freely oscillatable in said fluid, means of connection between the piston and the moving element the motion of which is to be checked, an element in the casing being met by the free end of said piston only on the initial position of the piston so as to prevent movement of fluid from one side of the piston to the other, the free end of the piston being in an arcuate sliding line contact with said element.

HARRY D. NEWHART.